United States Patent
Jennings et al.

(10) Patent No.: US 7,891,009 B2
(45) Date of Patent: Feb. 15, 2011

(54) TIME DATA CHECKING UNIT, ELECTRONIC DEVICE AND METHOD FOR CHECKING A TIME INDICATION

(75) Inventors: Gerard David Jennings, Munich (DE); Eckhard Delfs, Nuremberg (DE); Uma Ranjan, Bangalore (IN); Andreas Siggelkow, Erding (DE)

(73) Assignee: Infineon Technologies AG (DE)

( * ) Notice: Subject to any disclaimer, the term of this patent is extended or adjusted under 35 U.S.C. 154(b) by 616 days.

(21) Appl. No.: 11/551,518

(22) Filed: Oct. 20, 2006

(65) Prior Publication Data

US 2007/0110109 A1    May 17, 2007

(30) Foreign Application Priority Data

Oct. 20, 2005   (DE) ................. 10 2005 050 352

(51) Int. Cl.
   *G06F 7/04* (2006.01)
(52) U.S. Cl. ........................... 726/27; 713/178
(58) Field of Classification Search .................. None
   See application file for complete search history.

(56) References Cited

U.S. PATENT DOCUMENTS

| | | | | |
|---|---|---|---|---|
| 6,393,263 | B1* | 5/2002 | Hayashi | 455/145 |
| 2003/0004875 | A1* | 1/2003 | Kramer et al. | 705/40 |
| 2003/0233553 | A1 | 12/2003 | Parks et al. | |
| 2005/0038757 | A1* | 2/2005 | Wada | 705/400 |
| 2005/0181761 | A1 | 8/2005 | Park | |
| 2006/0107042 | A1* | 5/2006 | Kohmoto | 713/158 |
| 2006/0150254 | A1* | 7/2006 | Siukonen | 726/27 |
| 2008/0273705 | A1* | 11/2008 | Hasegawa | 380/278 |

FOREIGN PATENT DOCUMENTS

EP    1 460 509 A1    9/2004

OTHER PUBLICATIONS

Seifart, M.; "Digitale Schaltungen"; 3., bearb. Aufl., Heidelberg: Huethig, 1988, pp. 288-290, ISBN 3-7785-1546.2.

\* cited by examiner

*Primary Examiner*—Huy D Vu
*Assistant Examiner*—Benjamin Lamont
(74) *Attorney, Agent, or Firm*—Dickstein Shapiro LLP

(57) ABSTRACT

A first time indication which can be changed by a user and stored in a first memory. Furthermore, in the case of a change in the first time indication which is performed externally to the checking device, the difference between the stored first time indication and the changed first time indication is determined. Furthermore, it is checked whether a predetermined criterion is met by using a trustworthy second time indication, the first time indication and the difference.

15 Claims, 6 Drawing Sheets

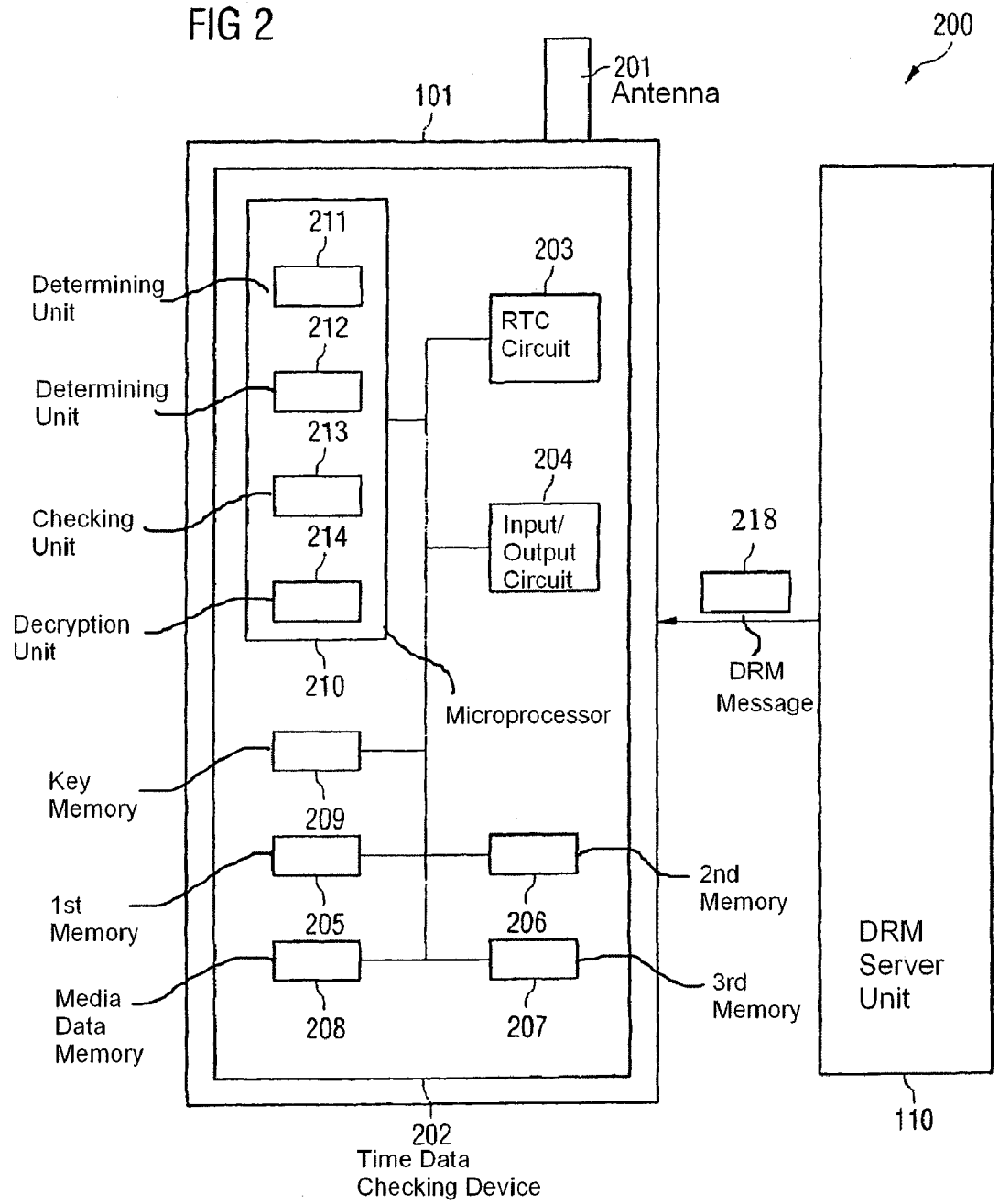

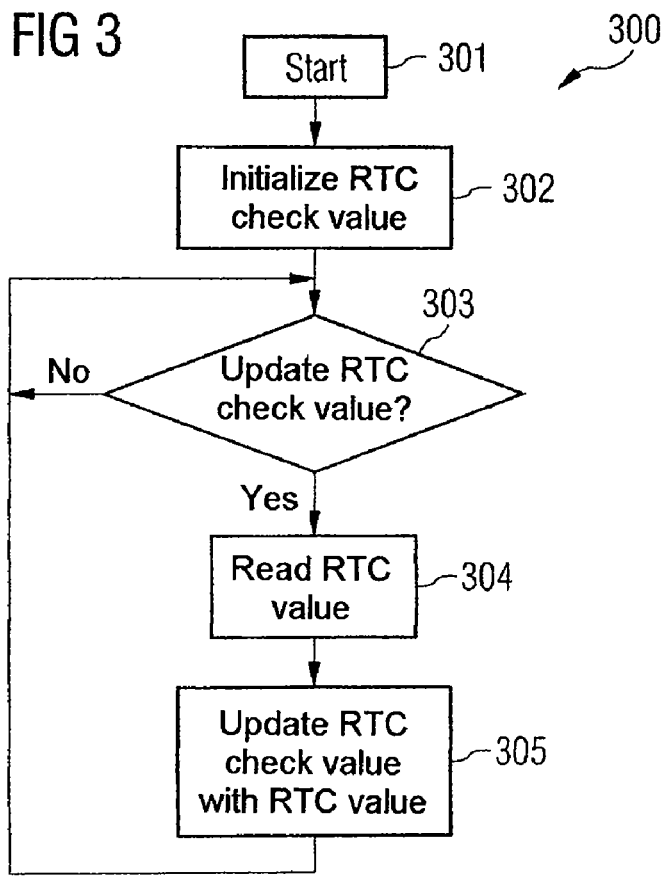
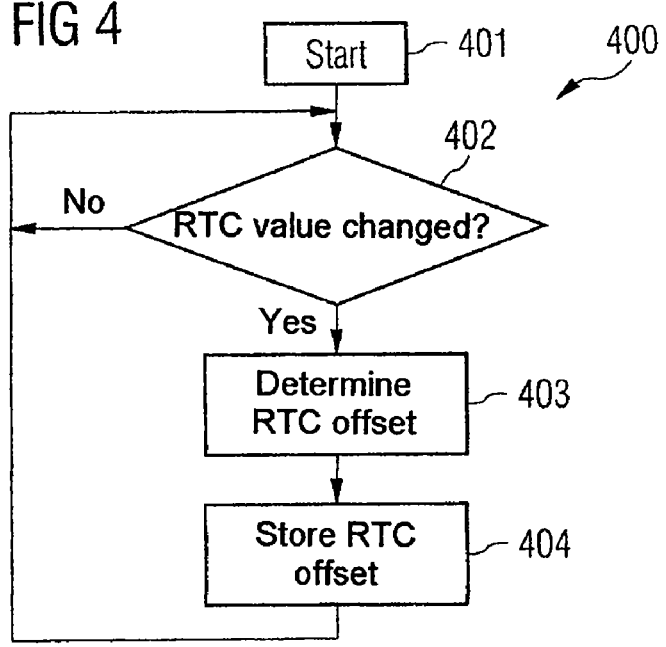

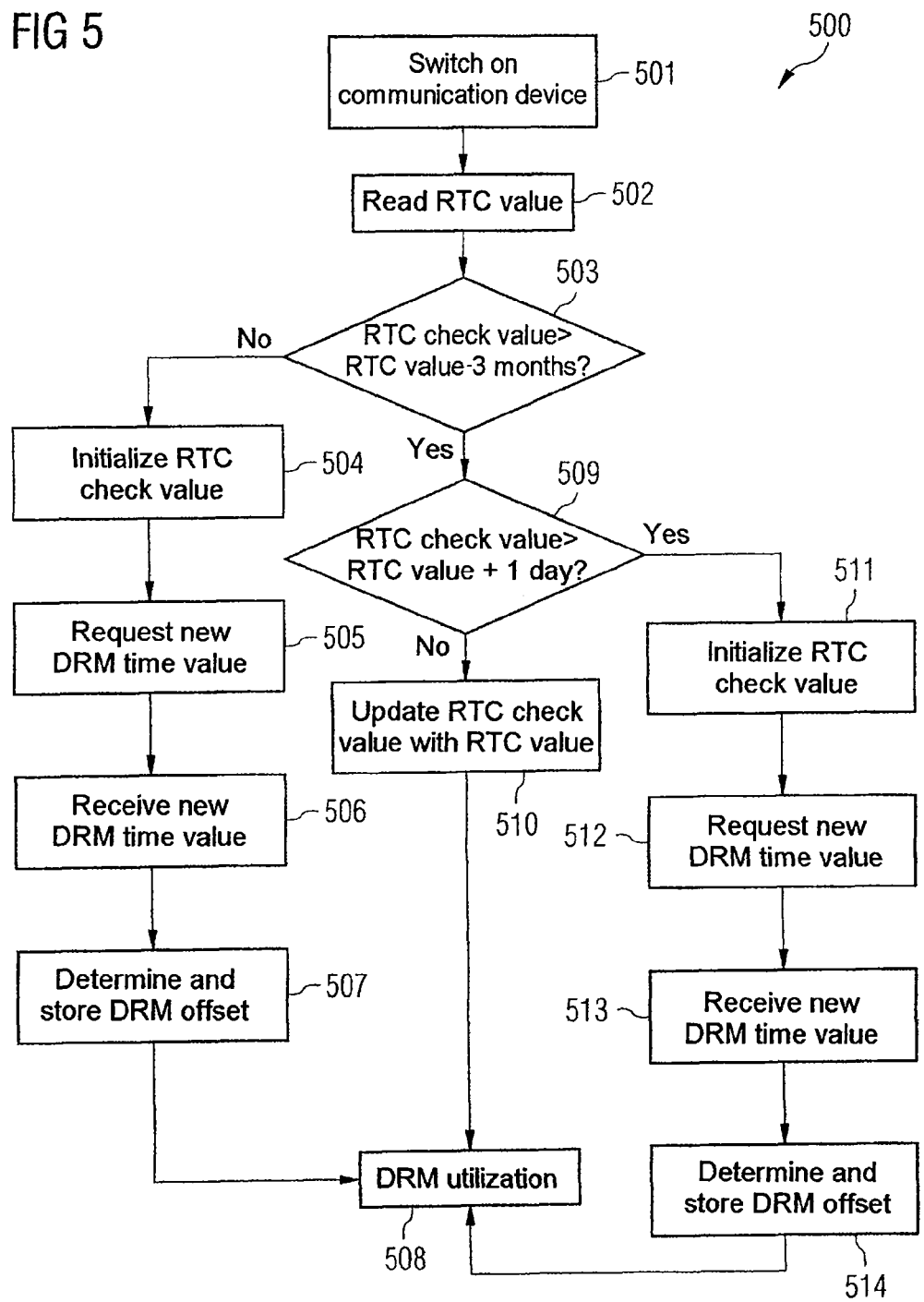

TIME DATA CHECKING UNIT, ELECTRONIC DEVICE AND METHOD FOR CHECKING A TIME INDICATION

CROSS-REFERENCE TO RELATED APPLICATION

This application claims priority to German Patent Application Serial No. 10 2005 050 352.7-31, which was filed on Oct. 20, 2006, and is incorporated herein by reference in its entirety.

BACKGROUND OF THE INVENTION

As media data in digital and easily copied form are becoming more widely used, it is important that only those users who have acquired the corresponding access rights can access media data. Such access rights can also be granted with a time limit. In this case it is required, for example, that it is possible to check by means of a trustworthy time indication whether access rights are valid.

BRIEF DESCRIPTION OF THE FIGURES

FIG. 2 shows a block diagram which shows a mobile radio communication terminal and a DRM server unit according to an exemplary embodiment of the invention;

FIG. 3 shows a flowchart which shows the storing of the first time indication in a first memory;

FIG. 4 shows a flowchart which shows individual steps for determining the RTC offset time indication which is stored in the second memory;

FIG. 5 shows a flowchart which shows the processing of a trustworthy second time indication;

DETAILED DESCRIPTION OF THE INVENTION

Figure 1:
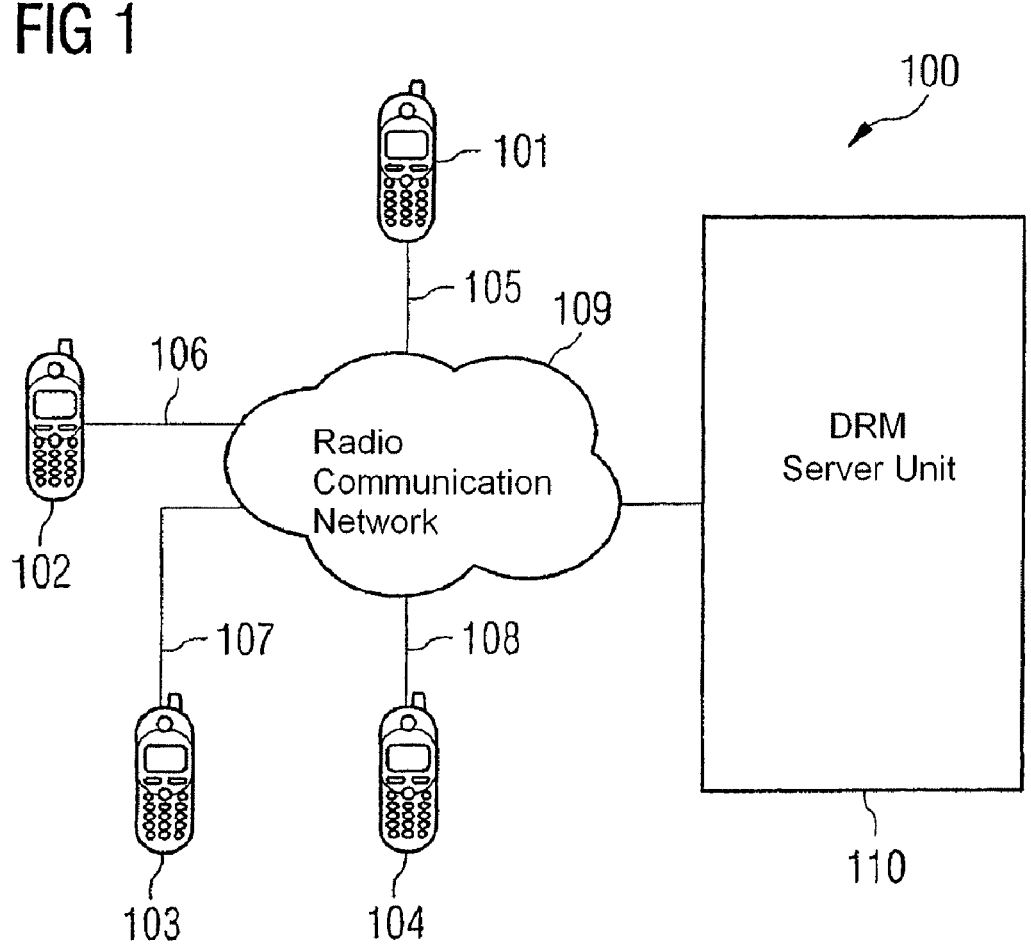
FIG. 1 shows a DRM communication system according to an exemplary embodiment of the invention.

In a trust-based system, access to an entity such as, for example, to digital content, also called media data in the text which follows, is usually restricted by predetermined access rights. One type of a usual access prerequisite is that a temporal access criterion is met. For example, a temporal access criterion can be seen in that a user may only access the media data, or the media data can only be shown to the user, respectively, for a predetermined period of time or up to a predetermined time.

Mobile communication devices, for example mobile radio telephones or other mobile terminals usually have a so-called real-time clock (RTC) time data circuit. The RTC circuit usually provides the system time with a certain accuracy. The RTC circuit, also called RTC module, is set up in such a manner that short power supply interruptions, interruptions in the power supply in other words, can be tolerated and do not lead to an impairment of the time indication provided. However, longer interruptions in the power supply usually lead to an inaccurate internal time indication being generated in the RTC circuit. This error cannot be detected currently with internal devices within the mobile terminal. It is also possible that the user changes the system time in order to obtain access to digital rights management (DRM) material for which he actually no longer has access rights. For DRM applications, it is desirable that voltage and power supply interruptions, for example voltage interruptions and malicious interactions by a user, e.g. by means of a mobile terminal, do not lead to unauthorized utilization of the DRM material.

In a mobile radio terminal, it would be possible to check the actual time by synchronizing the system time of the mobile radio terminal with the time indication provided by the mobile radio communication network, for example by synchronization with the GSM time/date information in a GSM mobile radio communication network. However, this feature is only optional in GSM and in the associated mobile radio communication terminals and is not offered in all mobile radio communication networks or not in all mobile radio cells, respectively.

Another possibility for providing a reliable time indication, for example for a DRM, can be seen in that a second time data provision circuit is implemented in hardware in the terminal, the second time data provision circuit being set up in such a manner that the user of the terminal is not able to change this time indication. However, this solution is very complex and thus cost-intensive since a number of hardware circuits are required for providing different time data. Furthermore, this solution does not solve the problem of the interruption in the power supply.

According to an exemplary embodiment of the invention, a check is made whether a predetermined, for example temporal criterion is met in a cost-effective manner by means of only one time data provision unit which provides a time indication which can be changed by a user.

A time data checking device according to an exemplary embodiment of the invention has a time data provision unit, for example implemented by means of a special electronic circuit, thus implemented in hardware, for example, which provides a first time indication which can be changed by a user. Furthermore, a first memory for storing the first time indication is provided as well as a time indication change determining unit for determining changes in the first time indication performed externally to the checking device, by means of which a changed first time indication is generated. The change performed externally to the checking device can be performed, for example, by a user of an electronic device in which the time data checking device is implemented as embedded application, for example by means of keys or other tactile input units mounted on the electronic device or, alternatively, by means of a user voice input which is detected by a voice recognition device in the electronic device and is correspondingly processed. Furthermore, a time indication difference determining unit is provided for determining the difference between the stored first time indication and the changed first time indication. By this means, for example, a so-called offset between the first time indication and the changed first time indication is determined. A second memory for storing the difference between the stored first time indication and the changed first time indication and/or the changed first time indication is also provided as is a third memory for storing a trustworthy second time indication. The time data checking device also has a checking unit by means of which a check is made whether a predetermined criterion is met by using the first time indication, the difference between the stored first time indication and a changed first time indication, and the second time indication.

Furthermore, an electronic device with such a time data checking device is provided according to an exemplary embodiment of the invention.

In a method for checking a time indication according to an exemplary embodiment of the invention which is performed by a time data checking device, a time data provision unit provides a first time indication which can be changed by a user. Furthermore, the first time indication is stored in a first memory. A change in the first time indication performed externally to the checking device, by means of which a changed time indication is generated, is determined. Furthermore, the difference between the stored first time indication and the changed first time indication is determined. The difference between the stored first time indication and the changed first time indication and/or the changed first time indication is stored in a second memory. Furthermore, a trustworthy second time indication is stored in a third memory and a check is made whether a predetermined criterion is met by using the first time indication, the difference between the stored first time indication and a changed first time indication, and the second time indication.

The time data provision unit can be a real-time clock circuit which is set up for providing the first time indication as real-time clock (RTC) time indication.

According to a first embodiment of the invention, the first memory can be set up in such a manner that the stored first time indication cannot be changed by a user of the checking device. In this case, the stored first time indication as stored in the first memory is thus protected against unauthorized change and only the difference, which is stored in the second memory, can be changed actually within the time data checking device by a user input for changing the first time indication.

According to another embodiment of the invention, the second memory is set up in such a manner that the stored difference between the stored first time indication and the changed time indication and/or the changed first time indication cannot be changed by a user. In this case, the difference or, respectively, the changed first time indication, is thus protected against an access by a user in the case of a change of the first time indication by a corresponding user input and the first time indication stored in the first memory is correspondingly adapted.

At least one of the following memories is set up as nonvolatile memory in accordance with an embodiment of the invention:
the first memory and/or
the second memory and/or
the third memory.

The memory or memories can thus be set up as flash memory (for example as floating gate memory or as trapping layer memory, for example as NROM memory (nitrided read only memory)), as magnetoresistive random access memory (magnetic random access memory, MRAM memory), as ferroelectric random access memory (FeRAM memory), as conductive bridging random access memory (CBRAM memory), as organic random access memory (ORAM memory), as phase change random access memory (PCRAM memory) or as another nonvolatile memory.

According to an embodiment of the invention, the trustworthy second time indication is a digital rights management (DRM) time indication by means of which it is specified how long and/or up to which time media data are allowed to be used which are provided, for example, as part of the digital rights management and to which, for example, the second time indication is allocated.

In one embodiment of the invention, the checking unit is set up in such a manner that it checks whether media data to which the second time indication is allocated are allowed to be displayed.

This guarantees in a simple manner, for example in the context of the DRM, by means of only one circuit, that is to say by means of only one real-time clock circuit that the representation of media data is secured only within the context of the temporal validity criterion without opening up a possibility for misuse which could be useful for an attacker. As shown above, this takes place due to the fact that, to illustrate, the first time indication, a respective change in the first time indication performed, for example, by a user, and the trustworthy DRM time indication are used for determining whether the media data should still be provided to the user or, in other words, whether the media data are still valid.

According to another embodiment of the invention, it is provided that the media data are transmitted encrypted to the respective electronic device for representation to a user and it is required to decrypt them before the media data are represented.

When such a, for example, cryptographic security mechanism is used, a key memory is provided in the time data checking device according to one embodiment of the invention for storing at least one cryptographic key to which the second time indication is allocated, wherein the validity of the at least one cryptographic key can be determined by means of the second time indication.

According to this embodiment of the invention, the validity of the media data is checked indirectly in this manner by checking the validity of the cryptographic key to be used for decrypting the media data which are present in encrypted manner.

In general, however, this embodiment of the invention can also be applied to any type of checking another cryptographic element, for example a cryptographic certificate which forms the basis for a temporal validity period.

If the media data are at present encrypted, a decryption unit for decrypting the media data by using the at least one cryptographic key can be provided in the time data checking device.

For the encryption or decryption, respectively, any cryptographic methods can be used, for example symmetric encrypting methods or asymmetric encrypting methods, wherein the respective cryptographic key is set up in such a manner that it is suitable for decrypting the encrypted media data. For example, the DES method can be used as symmetric method for encryption and the RSA method can be used for asymmetric encryption.

Furthermore, additional cryptographic security mechanisms can be provided, for example a digital signature over the encrypted media data.

In one embodiment of the electronic device, it can have a media data display device for displaying media data, wherein the media data display device is coupled to the time data checking unit, the media data display device being set up in such a manner that it only displays the media data when the checking unit has determined that the criterion is met.

This illustratively ensures that the media data can only be displayed to a user of the electronic device, for example by means of a screen and/or a loudspeaker as media data display device, when the predetermined criterion, for example the predetermined temporal criterion, is met. A screen is used for displaying, for example, graphic media data and the loudspeaker is used for representing audio media data.

According to an embodiment of the invention, the electronic device is set up as communication device, for example as mobile radio communication terminal. As an alternative, the electronic device can be any type of computing unit which, for example, is provided by means of a corresponding input/output interface for receiving and processing the confidential second time indication, for example a personal computer (PC), a laptop, a notebook, a personal digital assistant (PDA), etc.

According to an exemplary embodiment of the invention, the result is thus that it is ensured, even with a prolonged failure of the power supply and with an unauthorized change of the system time by a user by means of the embedded application with the secure time data provision unit that, for example in the context of DRM, only those data are displayed to a user in which the time interval of use has not yet elapsed, generally, in which the use and display of the media data by the user is permissible according to the access criterion or according to the access criteria in the context of the DRM. Furthermore, the user is enabled to change the first time indication in any direction.

As described above, another field of application is the validation of electronic certificates by using the time data checking device as a result of which it is made impossible for an attacker to use expired electronic certificates.

According to an exemplary embodiment of the invention, each change of the first time indication performed and initiated by a user, generally externally to the checking device, is stored in a secure memory. Furthermore, the actual RTC time is regularly stored, for example twice a day, generally in predeterminable time intervals, in a secure memory.

If a DRM agent process sets up a connection to a DRM server unit and applies or requests a product, the DRM time allocated and attached to the product is stored as a DRM offset time indication in a secure memory, for example as trustworthy second time indication. This DRM offset is only updated when the DRM agent process determines a new time indication from the DRM server unit. This information makes it possible to keep the user from consuming DRM contents, also called media data in the text which follows, when the permission for this has expired. This even applies in the case of an interruption of the power supply for the electronic device with the time data checking device. Thus, no additional hardware is required for the RTC circuit which is usually provided in an electronic device, in any case.

This software-based solution explained above and in greater detail in the text which follows is cost-effective and requires only some secure memories additionally in the electronic device or in the time data checking device, respectively. Furthermore, it is not required to synchronize two different counters with one another.

To illustrate, according to an exemplary embodiment of the invention, all changes of the first time indication are thus tracked and stored and reference points are stored as time data in a secure memory. This makes it possible to detect the permitted DRM time interval during which the use of media data is allowed. The time data can contain a clock-time time indication and/or a data time indication, for example in the form of a HTTP (hypertext transfer protocol) string according to the HTTP protocol as defined in the DRM standard of the Open Mobile Alliance (OMA).

In general, however, any type and any format of a time indication can be used in the context of the invention.

Exemplary embodiments of the invention are shown in the figures and will be explained in greater detail in the text which follows.

FIG. 1 shows a mobile radio communication system 100 with a multiplicity of mobile radio communication terminals 101, 102, 103, 104 which are coupled to a mobile radio access network, for example a radio access network (RAN) according to GSM, by means of a respective mobile radio communication link 105, 106, 107, 108 or to a mobile radio communication network 109 by means of a UMTS Terrestrial radio access network (UTRAN) according to UMTS. Furthermore, the mobile radio communication network 109 is coupled to a digital rights management server unit 110 (DRM server unit).

The mobile radio communication network 109 and the mobile radio communication terminals 101, 102, 103, 104 and the communication carried out between these is set up in accordance with any mobile radio communication standard, for example GSM, UMTS, CDMA200, FOMA, etc.

The DRM server unit 110 and the communication as part of the digital rights management, that is to say as part of the DRM, according to these embodiments, are effected according to the DRM Standard 1.0 or according to the DRM Standard 2.0 of the Open Mobile Alliance (OMA). The protocol messages provided and exchanged as part of the digital rights management are correspondingly also set up in accordance with the respective DRM standard used.

FIG. 2 shows in a block diagram 200 the DRM server unit 110 and one of the mobile radio communication terminals 101 in detail. For reasons of simpler representation, only a direct communication link between the mobile radio communication terminal 101 and the DRM server unit 110 is shown.

The mobile radio communication terminal 101 has an antenna 201 and usual units (not shown) of a mobile radio communication terminal such as, for example, a screen, a keypad, a loudspeaker, a microphone, etc.

As is also shown in FIG. 2, the mobile radio communication terminal 101 and the other mobile radio communication terminals 102, 103, 104 also have a time data checking device 202.

The time data checking device 202 has a real-time clock circuit (RTC circuit) 203 as time data provision unit. The RTC circuit 203 provides a first time indication, which can be changed by a user and which will be called RTC or also system time in the text which follows. The RTC can be changed initiated by a user, for example by means of a corresponding user input by means of a keypad or by means of a voice recognition device provided in this case in the mobile radio communication terminal 101 which recognizes and correspondingly processes voice signals (voice command) spoken by a user.

Furthermore, an input/output circuit 204 is provided which provides a communication link to the mobile radio communication network 109 and, in addition, to the DRM server unit 110, if necessary.

Furthermore, the time data checking device 202 in the mobile radio communication terminal 101 has a number of memories which can be implemented as separate memories or as different memory areas in a common memory.

As is shown in FIG. 2, the following memories are provided in accordance with this embodiment of the invention:

A first memory 205 for storing an RTC check value. When the mobile radio communication terminal 101 is used for the first time, the RTC check value is set to a predeterminable initialization value, the value 0xFFFF_FFFF according to the present exemplary embodiment. The RTC check value is updated in predeterminable time intervals, for example twice a day by storing the current RTC value in each case, and it must be noted that the number and frequency of updates is predeterminable, for example, by the mobile radio communication terminal manufacturer.

An RTC offset memory as second memory 206 for storing an RTC offset value which represents the difference of the RTC check value and the changed first time indication formed due to a change in the RTC time value, that is to say the first time indication. When the mobile radio communication terminal 101 is used for the first time, the RTC offset value is set to a predeterminable initialization value, to the value 0 according to the present exemplary embodiment. The RTC offset value is recalculated every time a user changes the RTC. In the factory, the RTC offset value is initialized to the value 0 by the mobile radio communication terminal manufacturer. Furthermore, the RTC offset value is only reset to the value 0 when the mobile radio communication terminal is not supplied with power, for example, therefore, when the battery of the mobile radio communication terminal 101 is removed and the RTC is not available. The first time the RTC is set, the RTC offset value is also correspondingly set. The RTC offset value can be a negative value or a positive value in dependence on the state of the RTC when the mobile radio communication terminal 101 is supplied with power for the first time and is started up.

A third memory 207, also called DRM offset memory in the text which follows, in which a DRM offset value, which will be explained in even greater detail in the text which follows, is stored as trustworthy second time indication. The DRM offset value is initialized at the first use of the mobile radio communication terminal 101 with a predeterminable initialization value, with 0xFFFF_FFFF according to the present exemplary embodiment of the invention. After a DRM time value has been transmitted from the DRM server unit 110 to the mobile radio communication terminal 101 as will be explained in even greater detail in the text which follows, for example in a DRM time value message 218 by means of which the absolute DRM time for media data, for example for one or more music items or one or more video films etc. is available, the DRM offset value is calculated in accordance with the following rule:

$$DRM \text{ offset time value} = DRM \text{ time value} - RTC - RTC \text{ offset time value}. \quad (1)$$

In a fourth memory 208 (also called media data memory 208 in the text which follows), encrypted or unencrypted media data are stored which are provided by the DRM server unit 110 or by another service provider and are transmitted to the mobile radio communication terminal 101.

To the media data, temporal validity data are in each case allocated as part of the DRM, for example in the form of a cryptographic key with limited temporal validity, when the media data are transmitted to the mobile radio communication terminal 101 in encrypted form, wherein the cryptographic key or keys which can be used for decrypting the encrypted media data (or for validating the media data when a digital signature is used), is/are stored in a key memory 209.

In this connection, it must be noted that the initialization value 0xFFFF_FFFF is interpreted as invalid flag for a DRM agent as part of the DRM.

Furthermore, a microprocessor 210 is provided which has the following units implemented in the form of computer programs. It must be noted that the units can also be implemented in the form of separate electronic circuits in each case or separate microprocessors.

A time indication change determining unit 211 is provided for determining a change in the first time indication which is performed externally to the checking device, by means of which a changed first time indication is generated. The time indication change determining unit 211 can detect, for example, the start of a process which is used for changing the RTC within the mobile radio communication terminal 101.

Furthermore, a time indication difference determining unit 212 is provided for determining the difference between the stored first time indication and the changed first time indication.

Furthermore, a checking unit 213 is provided by means of which it is checked, by using the first time indication (more precisely by using the RTC check value), the difference between the stored first time indication (i.e. for example of the RTC check value) and a changed first time input, and the second time indication, whether a predetermined criterion is met.

Furthermore, a decryption unit 214 is provided which is set up for decrypting the encrypted media data by using a suitable decryption key for this purpose which is stored in the key memory 209.

Furthermore, the mobile radio communication terminal 101 has a playback unit, not shown, for playing back or displaying the decrypted media data when the time data checking device 202 has determined that the media data are valid and may be represented to the user.

According to the present embodiment of the invention, the first memory 205 in which the RTC check value is stored is set up as chip-external and optionally as mobile-radio-communication-terminal-external flash memory which is set up as read-only memory as part of the user (data) space. The second memory 206, in which the RTC offset time value is stored, is also set up as chip-external and optionally as mobile-radio-communication-terminal-external flash memory which is set up as read/write memory in the user space but which can only be accessed by the DRM agent also implemented in the mobile radio communication terminal 101. The DRM offset memory 207, in which the DRM offset time value is stored, is also correspondingly set up.

For the exemplary embodiments of the invention described above, it is assumed, without restricting the general validity, that a reliable start-up of the mobile radio communication terminal 101 is ensured and only signed, i.e. trustworthy software is loaded into the mobile radio communication terminal 101 and only such trustworthy software is used for updating software stored in the mobile radio communication terminal 101. It is also assumed that the entire communication system and the application software are trustworthy or that the application software is restricted with regard to the access rights to the operating system and the device driver units and/or middleware components.

In an alternative embodiment of the invention, it can also be provided that the data and the offset time values which are stored in the memories described above are stored in encrypted form as a result of which an increased degree of security is achieved.

It must be noted that every time a user of the mobile radio communication terminal changes the RTC, the RTC offset time value is updated and the updated RTC offset time value is stored in the second memory 206. The RTC time value provided is stored twice a day as RTC check value in the first memory 205.

When a time-dependent DRM scenario is used, that is to say when a DRM agent in the mobile radio communication terminal 101 contacts a DRM server unit 110 for the first time in order to obtain an associated DRM time value, the DRM agent in the mobile radio communication terminal 101 calculates the DRM offset value in accordance with the rule (1) described above after the communication link to the DRM server unit 110 has been set up and the DRM time value has been transmitted to the mobile radio communication terminal 101 in a DRM message 218.

In a DRM scenario, a reliable, and thus trustworthy DRM time indication in the mobile radio communication terminal 101 is a prerequisite for the use in a time-dependent utilization of digital content, that is to say in the utilization of media data. It can be provided for this purpose that a time interval is allocated to respective media data in which the media data are considered to be valid, for example less than three months (less than an arbitrarily predeterminable time interval, in principle), calculated into the future from a current time and less than one day into the past (less than an arbitrarily predeterminable time interval, in principle). This time interval should be guaranteed. If the media data are considered to be valid, it is not required in this case that a new DRM time indication is determined from the DRM server unit 110. The actual future time period and the past time period or their limits, respectively, can be defined by the mobile radio communication terminal manufacturer and thus predetermined, for example by taking into consideration inputs or requirements by the network operator.

FIG. 3 shows in a flowchart 300 a method for updating the RTC check value with the RTC value as was described above.

After the start of the method (step 301), the RTC check value is initialized with the value 0xFFFF_FFFF (step 302) (this step is only performed when the method is performed for the first time), and then a check is made whether the RTC check value is to be updated (check step 303). If this is the case, for example if a predeterminable time for updating the RTC check value is reached, the current RTC value, that is to say the RTC time indication is read (step 304) and the RTC check value which is stored in the first memory 205 at this time is updated, that is to say overwritten with the RTC value read (step 305). The method is then continued in check step 303 in which the method remains until the RTC check value must be updated again in each case.

FIG. 4 shows in a flowchart 400 the method for changing the RTC offset value, a check being made, after the start of the method (step 401), whether the RTC offset value has been changed (check step 402). If the RTC value has been changed, for example, by a user, the RTC offset time value is determined (step 403) and stored in the RTC offset memory 206 (step 404). The method is then continued in check step 402 in which the method remains until the RTC value is changed again, for example by the user of the mobile radio communication terminal 101.

In the text which follows, the method is described which is performed by the mobile radio communication terminal 101 when the mobile radio communication terminal 101 is switched on (compare flowchart 500 in FIG. 5). During the time in which the mobile radio communication terminal 101 is switched off, the RTC continues to run, i.e. the RTC circuit 203 continues to count, but the values in the memories are not updated.

After the mobile radio communication terminal 101 is switched on (step 501), the RTC value is read (step 502).

The RTC value read is compared with the RTC check value which is stored in the first memory 205 and in the case where the RTC check value is not greater than, for example less than the difference of the RTC value and a predetermined period of time, for example three months, an invalidity mode is started on the basis of which the method steps described in the text which follows are carried out.

The reason for the invalidity mode is in this case that it has been determined from the result determined in check step 503 that the mobile radio communication terminal 501 was switched off for longer than three months. For this case, the RTC check value is set as invalid, or in other words, reset to the invalidity value, i.e. the initialization value. According to the present exemplary embodiment of the invention, this means that the RTC check value is set to the initialization value 0xFFFF_FFFF (step 504) which means that, in the case where media data are to be represented by means of the mobile radio communication terminal 101 and in this connection by means of the DRM agent of the mobile radio communication terminal 101, it is required that the mobile radio communication terminal 101 and the DRM agent of the mobile radio communication terminal 101 therein requests from the DRM server unit 110 a new DRM time value (step 505). After receiving the new time value (step 506) from the DRM server unit 110, the DRM offset time value is determined in accordance with the rule (1) described above and stored in the DRM offset memory 207 (step 507).

Following this, the media data can be used again, thus, for example, the encrypted media data can be decrypted by means of the cryptographic key stored in the key memory 209 and displayed to the user (symbolized by block 508 in FIG. 5).

If it has been determined in check step 503 that the RTC check value is greater than the difference from the RTC value and the predetermined value of three months, it is determined in a subsequent check step (step 509) whether the RTC check value is greater that the sum of the RTC value and the history time value, of one day in accordance with the present exemplary embodiment.

If it has been found in check step 503 that the RTC check value is greater than the difference of the RTC value and the three months, this means, to illustrate, that the mobile radio communication terminal 101 was switched off for less than three months.

If, in addition, the RTC check value is less than or equal to the RTC value plus the history time value, of one day according to the present exemplary embodiment, this means that this reliability condition is also met and the mobile radio communication terminal 101 is operated in normal operating mode, wherein the RTC check value is updated by the RTC value in a subsequent step (step 510) and it is subsequently enabled to utilize the media data (block 508).

If, however, the RTC check value is greater than the RTC value plus the history time value of one day, this means that the RTC time is "younger" than the stored time stamp. This is actually impossible if the mobile radio communication terminal was only switched off. Thus, the mobile radio communication terminal 101 is operated in this case in an invalidity mode and the RTC check value is set to an invalidity value, i.e. to the initialization value 0xFFFF_FFFF (step 511) and, in the case, where media data are to be utilized, it is required that the DRM agent of the mobile radio communication terminal 101 again requests a new DRM time value from the DRM server unit 110 (step 512). After receiving the new DRM time value (step 513) the DRM offset time value is determined by using the rule (1) and stored in the DRM offset memory 207 (step 514).

In the case where the battery has been removed from the mobile radio communication terminal 101, however, the RTC is normally updated again, i.e. the RTC circuit furthermore provides the first time indication internally and thus continues to count if the backup battery is also empty.

When the mobile radio communication terminal 101 is switched on, it is also checked in this case whether the RTC check value is greater than the RTC value minus the three months, in which case the normal mode is assumed and the RTC check value is simply updated. It is assumed in this case that the mobile radio communication terminal 101 was switched off for a shorter period than three months.

If, however, the RTC check value is smaller than the difference from the RTC value and the time indication of three months, the invalidity mode described above is performed and it may be required to request a new DRM time value from the DRM server unit 110 as explained above in connection with FIG. 5.

This correspondingly applies to the case where the RTC check value is greater than the RTC value plus one day.

In other words, this means that a new DRM time only needs to be determined from the DRM server unit 110 when the time values described above overrun their set security frame.

Figure 6:
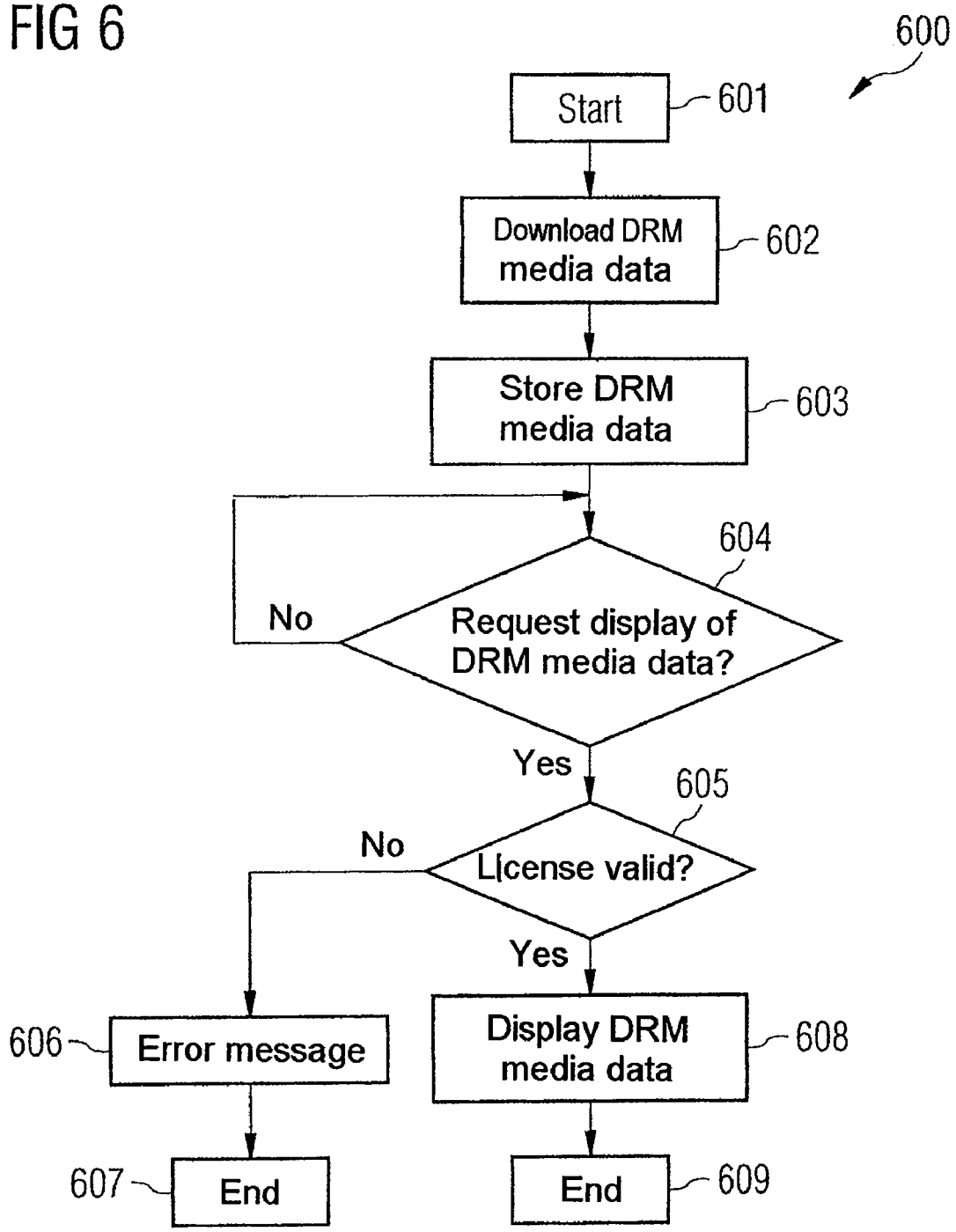
FIG. 6 shows a flowchart according to which it is checked whether media data are represented to a user, according to an exemplary embodiment of the invention.

FIG. 6 shows in a flowchart 600 the method which is performed as part of the presentation of DRM media data.

After the method is started (step 601), the DRM content, i.e. the DRM media data, is downloaded, for example, from the DRM server unit 110 to the mobile radio communication terminal 101 (step 602).

In the mobile radio communication terminal 101, the DRM media data downloaded are stored in the media data memory 208 (step 603), and in a continuous check loop, a check is made (check step 604) whether the stored DRM content is to be represented to the user by means of the mobile radio communication terminal 101.

If this is the case, a subsequent check is made whether a license normally allocated to the DRM media data and also transmitted is valid (check step 605), for example according to the methods described in the text which follows.

If the license is invalid, an error message is output (step 606) and the method is terminated (step 607). The media data are thus not output to the user in this case.

If the license is valid, the DRM media data may be decrypted and output to the user of the mobile radio communication terminal 101 (step 608). The method is terminated after the DRM media data have been completely represented (step 609).

For the exemplary scenarios described in the text which follows, it is assumed that the user of the mobile radio communication terminal 101 is authorized for playing back music media data from a current time (RTC=110) up to one week later, i.e. up to the next week starting from the current time (the final RTC is in this case=810).

The RTC check value was stored at the RTC time value=100 (it is assumed in this case that the updating of the RTC check value is performed every 50 counts) and the user has changed the RTC time value in such a way that the RTC offset time value has the value 5. This corresponds, for example, to a change in the first time indication from 12:05 to 13:22, for example, a change of the RTC time value from 105 to 110.

It is also assumed that the music media data, the decryption key allocated to the music media data and the DRM time are transmitted to the mobile radio communication terminal 101, assuming that the DRM time value has the value 112.

Now the DRM offset time value is calculated according to the following rule:

*DRM* offset time value=*DRM* time value−*RTC* time value−*RTC* offset time value=−3.

It is also assumed that the user is allowed to play the music media data back until the following condition is met:

*DRM* time value+*DRM* validity time interval (700 in the present case)=*RTC* time value+*RTC* offset time value+*DRM* offset time value+*DRM* validity time interval=812.

This time value is greater than the RTC time value (RTC=810).

To explain the exemplary embodiments of the invention, it is now assumed that the mobile radio communication terminal 101 was switched off at the time of the RTC time value=670 (RTC time value=670).

When the mobile radio communication terminal is switched on, the following values are obtained:
actual time=1010,
RTC=1010,
RTC check value=650 (only the RTC circuit was supplied with power, there were no write operations to the flash memory during the off state),
RTC offset time value=5,
DRM offset time value=−3,
DRM time value=RTC time value+RTC offset time value+DRM offset time value=1012.

This means that the checking unit 213 has determined that the license has expired. This mathematically determined result corresponds to the desired DRM result.

In the text which follows, a second exemplary case is assumed in which it is assumed that the mobile radio communication terminal 101 was switched off and then the battery was removed, this having been carried out at the RTC time value=680.

After the mobile radio communication terminal 101 is switched on, the following scenario is obtained:
actual time=1010,
RTC time value=680,
RTC check value=650,
RTC offset time value=5,
DRM offset time value=−3,
DRM time value=RTC time value+RTC offset time value+DRM offset time value=628.

This leads to the license being determined and accepted as valid by the checking unit 213 and thus the media data are decrypted and provided to the user which does actually not meet the DRM requirements.

However, it must be pointed out that such a manipulation does not enable a useful attack for unauthorized multiple use of media data to be performed. The mobile radio communication terminal 101 was switched off as a result of which a multiple utilization, i.e. display of the content, i.e. the media data was impossible.

In a third exemplary case it is assumed that the mobile radio communication terminal 101 was switched off at the RTC time value=670 (actual time=670).

When the mobile radio communication terminal 101 is switched on, the following scenario is obtained:
actual time=608,
RTC time value=680,
RTC check value=650,
RTC offset time value=5,
DRM offset time value=−3,
DRM time value=RTC time value+RTC offset time value+DRM offset time value=682.

This leads to the checking unit 213 determining and assuming that the time criterion is met and the media data are decrypted, if necessary, and represented to the user by means of the mobile radio communication terminal 101. This is correct also in accordance with the DRM requirements.

It is not possible to distinguish between the two cases represented last, i.e. it is not possible to distinguish, according to the exemplary embodiments of the invention, whether the mobile radio communication terminal 101 was only switched off or whether its battery has also been removed additionally.

However, an attack by removing the battery only makes actual sense if it is possible to reset the time into the past without this being noticed by the mobile radio communication terminal 101.

According to the embodiments of the invention, however, this is not possible without additional hardware, i.e. without additionally opening the mobile radio communication terminal 101 and/or removing parts of the mobile radio communication terminal 101.

Figure 7:
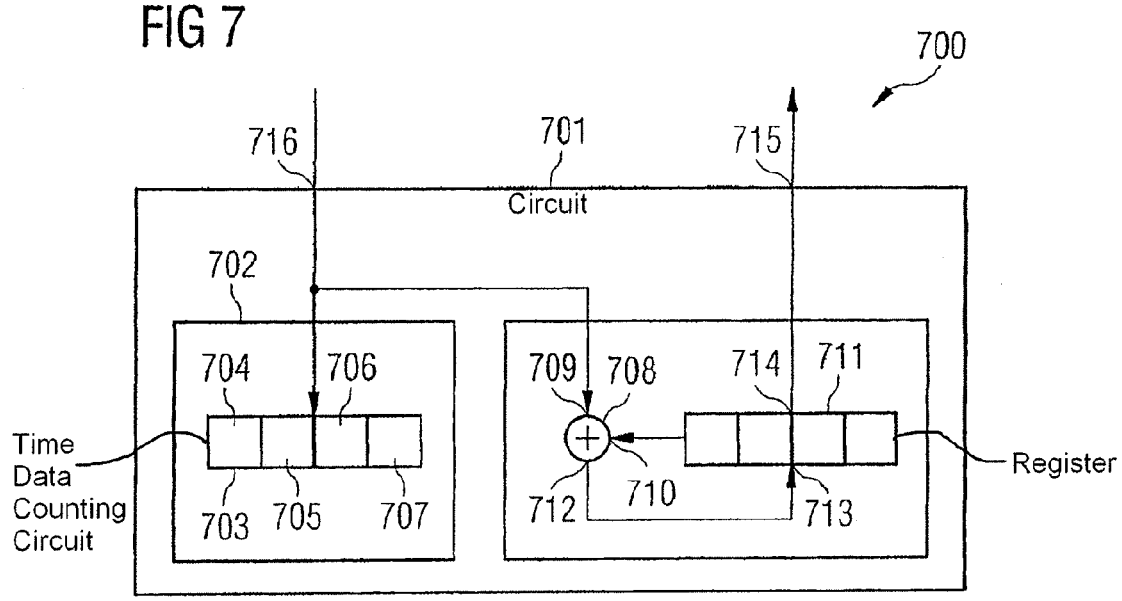
FIG. 7 shows a block diagram which shows a hardware implementation of an accumulator for determining the accumulated changes in the first time indication, for example by a user.

FIG. 7 shows in a block diagram 700 an exemplary embodiment in which the accumulator for forming the RTC offset time value is also implemented in hardware.

The circuit 701 has the RTC circuit 203, 702 which has a time data counting circuit 703 which, in turn, contains four counter circuits, namely,
- a year counter circuit 704,
- a day counter circuit 705,
- an hour counter circuit 706, and
- a minute counter circuit 707 for counting the respective year, day, the respective hour and minute.

Furthermore, an adder 708 is provided which is coupled to the counter circuit 703 by means of a first input 709 and its second input 710 is coupled to an output of a register 711 in which the RTC offset time value is stored.

The output 712 of the adder 708 is connected to an input 713 of the register 711. A further output 714 of the register 711 is coupled to an output 715 of the circuit 701. An input 716 of the circuit 701 is coupled to an input of the counter circuit 703. At the output 715 of the circuit 701, the accumulated DRM offset time value is provided.

The invention claimed is:

1. A time data checking device, comprising:
  a time data provision unit that provides a first time indication which can be changed by a user;
  a first memory that stores the first time indication;
  a time indication change determining unit that determines a change in the first time indication performed externally to the time data checking device, such that a changed first time indication is generated by changing the first time indication to become the changed first time indication;
  a time indication difference determining unit that determines the difference between the stored first time indication and the changed first time indication;
  a second memory that stores the difference between the stored first time indication and the changed first time indication or the changed first time indication or both;
  a third memory that stores a trustworthy second time indication; and
  a checking unit that checks whether a predetermined criterion is met by using the first time indication, the difference between the stored first time indication and the changed first time indication, and the trustworthy second time indication,
  wherein the stored first time indication cannot be changed by a user, or wherein the stored difference between the stored first time indication and the changed first time indication or the changed first time indication or both cannot be changed by a user.

2. The time data checking device as claimed in 1, wherein the time data provision unit is a real-time clock circuit which provides the first time indication as real-time clock time indication.

3. The time data checking device as claimed in 1, wherein at least one of the first memory, the second memory, and the third memory is set up as nonvolatile memory.

4. The time data checking device as claimed in 1, wherein the trustworthy second time indication is a digital rights management time indication which specifies how long media data are allowed to be used or up to which time media data are allowed to be used or both.

5. The time data checking device as claimed in 4, wherein the checking unit checks whether media data to which the second time indication is allocated are allowed to be displayed.

6. The time data checking device as claimed in 5, wherein the media data is encrypted, and
  the time data checking device further comprises a decryption unit that decrypts the media data using the at least one cryptographic key.

7. The time data checking device as claimed in 1, further comprising a key memory that stores at least one cryptographic key to which the second time indication is allocated, and the validity of the at least one cryptographic key can be determined using the second time indication.

8. An electronic device with a time data checking device, comprising:
  a time data provision unit that provides a first time indication which can be changed by a user;
  a first memory that stores the first time indication;
  a time indication change determining unit that determines a change in the first time indication performed externally to the time data checking device, such that a changed first time indication is generated by changing the first time indication to become the changed first time indication;
  a time indication difference determining unit that determines the difference between the stored first time indication and the changed first time indication;
  a second memory that stores the difference between the stored first time indication and the changed first time indication or the changed first time indication or both;
  a third memory that stores a trustworthy second time indication; and
  a checking unit that checks whether a predetermined criterion is met by using the first time indication, the difference between the stored first time indication and the changed first time indication, and the trustworthy second time indication,
  wherein the stored first time indication cannot be changed by a user, or the stored difference between the stored first time indication and the changed first time indication or the changed first time indication or both cannot be changed by a user.

9. The electronic device as claimed in 8, further comprising a media data display device which displays media data, the media data display device being coupled to the time data checking device and only displaying the media data when the checking unit has determined that the criterion is met.

10. The electronic device as claimed in 8, further comprising at least one of a screen for displaying graphic media data and a loudspeaker for representing audio media data.

11. The electronic device as claimed in 8, set up as communication device.

12. A method for checking a time indication, performed by a time data checking device, comprising:
  providing a first time indication, which can be changed by a user, by a time data provision unit;
  storing the first time indication in a first memory;
  determining a change in the first time indication, performed externally to the time data checking device, such that a changed first time indication is generated by changing the first time indication to become the changed first time indication;
  determining the difference between the stored first time indication and the changed first time indication;

storing the difference between the stored first time indication and the changed first time indication or the changed first time indication or both in a second memory;

storing a trustworthy second time indication in a third memory; and checking whether a predetermined criterion is met by using the first time indication, the difference between the stored first time indication and the changed first time indication and the trustworthy second time indication, wherein the stored first time indication cannot be changed by a user, or the stored difference between the stored first time indication and the changed first time indication or the changed first time indication or both cannot be changed by a user.

13. A time data checking device, comprising:

a real-time clock that provides a real-time clock time indication which can be changed by a user;

a first memory that stores the real-time clock time indication;

a time indication change determining unit that determines a change in the real-time clock time indication, performed externally to the time data checking device, such that a changed real-time clock time indication is generated by changing the real-time clock time indication to become the changed real-time clock time indication;

a time indication difference determining unit that determines the difference between the stored real-time clock time indication and the changed real-time clock time indication;

a second memory that stores the difference between the stored real-time clock time indication and the changed real-time clock time indication or the changed real-time clock time indication or both;

a third memory that stores a trustworthy digital rights management (DRM) time indication; and a checking unit that checks whether a predetermined criterion is met by using the real-time clock time indication, the difference between the stored real-time clock time indication and a changed real-time clock time indication and the trustworthy DRM time indication, wherein the stored real-time clock time indication cannot be changed by a user, or the stored difference between the stored real-time clock time indication and the changed real-time clock time indication or the changed real-time clock time indication or both cannot be changed by a user.

14. A system comprising:

time data checking device, comprising:

a real-time clock that provides a real-time clock time indication which can be changed by a user;

a first memory that stores the real-time clock time indication;

a time indication change determining unit that determines a change in the real-time clock time indication, performed externally to the time data checking device, by means of which a changed real-time clock time indication is generated by changing the real-time clock time indication to become the changed real-time clock time indication;

a time indication difference determining unit that determines the difference between the stored real-time clock time indication and the changed real-time clock time indication;

a second memory that stores the difference between the stored real-time clock time indication and the changed real-time clock time indication or the changed real-time clock time indication or both;

a third memory that stores a trustworthy digital rights management (DRM) time indication; and a checking unit that checks whether a predetermined criterion is met by using the real-time clock time indication, the difference between the stored real-time clock time indication and the changed real-time clock time indication and the trustworthy DRM time indication, wherein the stored real-time clock time indication cannot be changed by a user, or the stored difference between the stored real-time clock time indication and the changed real-time clock time indication or the changed real-time clock time indication or both cannot be changed by a user; and a digital rights management server unit that provides the trustworthy DRM time indication to the time data checking device.

15. A time data checking device, comprising:

a time data provision means for providing a first time indication which can be changed by a user;

a first memory that stores the first time indication;

a time indication change determining means for determining a change in the first time indication performed externally to the time data checking device, by means of which a changed first time indication is generated by changing the first time indication to become the changed first time indication;

a time indication difference determining means for determining the difference between the stored first time indication and the changed first time indication;

a second memory that stores the difference between the stored first time indication and the changed first time indication or the changed first time indication or both;

a third memory that stores a trustworthy second time indication; and a checking means for checking whether a predetermined criterion is met by using the first time indication, the difference between the stored first time indication and the changed first time indication, and the trustworthy second time indication, wherein the stored first time indication cannot be changed by a user, or wherein the stored difference between the stored first time indication and the changed first time indication or the changed first time indication or both cannot be changed by a user.

* * * * *